(12) United States Patent  
Kogushi

(10) Patent No.: US 6,236,239 B1  
(45) Date of Patent: May 22, 2001

(54) OUTPUT BUFFER CIRCUIT ACHIEVING STABLE OPERATION AND COST REDUCTION

(75) Inventor: Noriaki Kogushi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/290,424

(22) Filed: Apr. 13, 1999

(30) Foreign Application Priority Data

Jul. 31, 1998 (JP) ................................................. 10-216582

(51) Int. Cl.[7] ........................ H03K 19/094; H03K 19/003
(52) U.S. Cl. ................................................. 326/88; 326/27
(58) Field of Search ............................... 326/86–88, 83, 326/26–27; 327/134, 379, 389, 391

(56) References Cited

U.S. PATENT DOCUMENTS

| | | | |
|---|---|---|---|
| 4,797,579 | * 1/1989 | Lewis | 326/27 |
| 4,823,029 | 4/1989 | Gabara | 326/27 |
| 4,857,863 | * 8/1989 | Ganger et al. | 330/264 |
| 5,051,625 | 9/1991 | Ikeda et al. | 326/27 |
| 5,557,235 | * 9/1996 | Koike | 327/564 |
| 5,748,019 | 5/1998 | Wong et al. | 327/170 |
| 5,872,473 | * 2/1999 | Williams | 327/108 |
| 5,883,531 | * 3/1999 | Kuo | 327/108 |

FOREIGN PATENT DOCUMENTS

WO 95/31041   11/1995  (WO) .

* cited by examiner

Primary Examiner—Michael Tokar  
Assistant Examiner—James A. Cho  
(74) Attorney, Agent, or Firm—Armstrong, Westerman, Hattori, McLeland & Naughton

(57) ABSTRACT

An output-buffer circuit includes a first output transistor connected between a first power line and an output node, a second output transistor connected between the output node and a second power line, an output-transistor control circuit which controls an on/off state of the first and second output transistors, and a capacitor for controlling a through-rate of an output signal output to the output node, wherein the output-transistor circuit includes a pull-up circuit connected between the first power line and a given node, a pull-down circuit connected between the given node and the second power line, a first switch device connected between a gate of the first output transistor and the given node, a second switch device connected between the first power line and the gate of the first output transistor, a third switch device connected between a gate of the second output transistor and the given node, and a fourth switch device connected between the gate of the second output transistor and the second power line, wherein the capacitor is connected between the output node and the given node.

13 Claims, 11 Drawing Sheets

OUTPUT BUFFER CIRCUIT ACHIEVING STABLE OPERATION AND COST REDUCTION

BACKGROUND OF THE INVENTION

1. Field of the Invention

The present invention relates to an output-buffer circuit of a through-rate-control type implemented on a semiconductor integrated circuit.

In recent years, a USB standard has been becoming increasingly popular as a communication standard for personal-computer peripherals. This standard defines a rising time Tf and a falling time Tf of an output signal. In order to meet the requirements for the rising time and the falling time, an output-buffer circuit of a through-rate-control type is generally used.

2. Description of the Related Art

FIG. 9 is a circuit diagram showing an example of a configuration of a related-art output-buffer circuit. FIG. 9 shows pad 1 serving as an output terminal, a driver circuit 2 for supplying an output signal OUT to the pad 1 in response to driver inputs PEN and NEN, and a bias circuit 3 for supplying voltages VP, VCNTR, and VN (VP>VCNTR>VN) to the driver circuit 2.

In the driver circuit 2, a pMOS transistor 4 has a source thereof connected to a VDD power line and a gate thereof receiving the voltage VP, and serves as a resistance. A pMOS transistor 5 has a source thereof connected to a drain of the pMOS transistor 4, a drain thereof connected to a node N1, and a gate thereof receiving the driver input NEN. A turned-on/off condition of the pMOS transistor 5 is controlled by the driver input NEN. The pMOS transistor 4 and the pMOS transistor 5 together form a pull-up circuit.

A nMOS transistor 6 has a drain thereof connected to the node N1 and a gate thereof receiving the driver input PEN, and is controlled by the driver input PEN with regard to a turned-on/off condition thereof. A nMOS transistor 7 has a drain thereof connected to the source of the nMOS transistor 6, a source thereof connected to a VSS power line, and a gate thereof receiving the voltage VN, and functions as a resistance. The nMOS transistor 6 and the nMOS transistor 7 together form a pull-down circuit.

An operational amplifier 8 has a non-inverted-input node receiving a voltage at the node N1 and an inverted-input node receiving the voltage VCNTR. The driver input PEN controls whether the operational amplifier 8 is activated. When the driver input PEN is at a HIGH level, the operation amplifier 8 is activated. When the driver input PEN is at a LOW level, on the other hand, the operation amplifier 8 is deactivated.

An operational amplifier 9 has a non-inverted-input node receiving the voltage at the node N1 and an inverted-input node receiving the voltage VCNTR. The driver input NEN controls whether the operation amplifier 9 is activated. When the driver input NEN is at the HIGH level, the operation amplifier 9 is deactivated. When the driver input NEN is at the LOW level, on the other hand, the operation amplifier 9 is activated.

A pMOS transistor 10 has a source thereof connected to the VDD power line, a gate thereof connected to an output terminal of the operational amplifier 8, and a drain thereof connected to the pad 1. The pMOS transistor 10 is used as an output transistor for a pulling-up purpose.

A nMOS transistor 11 has a drain thereof connected to pad 1, a gate thereof connected to an output terminal of the operational amplifier 9, and a source thereof connected to the VSS power line. The nMOS transistor 11 is used as an output transistor for a pulling-down purpose.

A pMOS transistor 12 has a source thereof connected to the VDD power line, a drain thereof connected to the gate of the pMOS transistor 10, and a gate thereof receiving the driver input PEN. A turned-on/off condition of the pMOS transistor 12 is controlled by the driver input PEN.

A nMOS transistor 13 has a drain thereof connected to the gate of the nMOS transistor 11, a source thereof connected to the VSS power line, and a gate thereof receiving the driver input NEN. The driver input NEN controls the turned-on/off condition of the nMOS transistor 13.

In this configuration, the PMOS transistors 4, 5, and 12, the nMOS transistors 6, 7, and 13, and the operational amplifiers 8 and 9 together form an output-transistor-control circuit.

A capacitor 14 is used for controlling a through-rate of the output signal OUT, i.e., used for controlling a rising time Tr and a falling time Tf. Here, the rising time Tr is defined as a time period necessary for the output signal OUT to rise from 10% to 90% of a maximum voltage thereof, and the falling time Tf is defined as a time period necessary for the output signal OUT to fall from 90% to 10% of a maximum voltage thereof.

In the bias circuit 3, a pMOS transistor 15 has a source thereof connected to the VDD power line and a gate thereof connected to a drain thereof, and the drain is connected to the gate of the pMOS transistor 4. A nMOS transistor 16 has a gate thereof connected to a drain thereof, which is in turn connected to the gate of the nMOS transistor 7, and further has a source thereof connected to the VSS power line.

A resistor 17 and a resistor 18 are connected in series between the drain of the pMOS transistor 15 and the drain of the nMOS transistor 16. A joint point between the resistor 17 and the resistor 18 is connected to the inverted-input nodes of the operational amplifiers 8 and 9.

In the bias circuit 3, the PMOS transistor 15, the resistors 17 and 18, and the nMOS transistor 16 serve as potential-divider elements. The voltage VP is generated at the drain of the pMOS transistor 15, and the voltage VCNTR is generated at the joint point between the resistor 17 and the resistor 18. Further, the drain of the nMOS transistor 16 has the voltage VN generated thereat.

In the output-buffer circuit having a configuration as described above, the pMOS transistor 5 and the nMOS transistor 6 are turned off and on, respectively, when both of the driver inputs PEN and NEN are HIGH as shown in FIG. 10. In this case, the voltage at the node N1 becomes LOW.

Also, the pMOS transistor 12 is turned off, and the operational amplifier 8 is activated so that the operational amplifier 8 supplies an output PDRV that is LOW. This turns on the pMOS transistor 10. Further, the operational amplifier 9 is deactivated, and the nMOS transistor 13 is turned on, so that the nMOS transistor 11 is turned off. The output signal OUT is thus at the HIGH level.

If the capacitor 14 was not provided, the output signal OUT would rise immediately when the PMOS transistor 10 is turned on. Because of presence of the capacitor 14, however, the rising time Tr of the output signal OUT becomes longer as the capacitor 14 initially holds electric charge.

This will be described in terms of a flow of an electric current. When both the driver input PEN and the driver input NEN are HIGH, a current Ip1 is generated via discharging of the non-inverted-input node of the operational amplifier 8, and a current Ic1 is generated by charge supplied from the capacitor 14.

The current Ip1 and the current Ic1 flow into the VSS power line via the nMOS transistors 6 and 7.

The amount of current In2 that can flow through the nMOS transistors 6 and 7 is limited by the turned-on resistance of the nMOS transistor 7, i.e., limited by the voltage VN. Because of this, only a limited amount of a current, which is less than a current Ifb1 combining the current Ip1 and the current Ic1, can flow through the nMOS transistors 6 and 7 to the VSS power line. As a result, the non-inverted-input node of the operational amplifier 8 does not exhibit a rapid voltage drop, so that the pMOS transistor 10 is turned on gradually. This elongates the rising time Tr of the output signal OUT.

In this manner, the rising time Tr of the output signal OUT of the output-buffer circuit can be adjusted by controlling the voltage VN which is applied to the gate of the nMOS transistor 7. The control of the voltage VN can be effected by changing the resistances of the resistors 17 and 18 in the bias circuit 3.

When both the driver input PEN and the driver input NEN are LOW, as shown in FIG. 11, the pMOS transistor 5 and the nMOS transistor 6 are turned on and off, respectively, so that the voltage at the node N1 becomes HIGH.

Also, the pMOS transistor 12 is turned on, and the operational amplifier 8 is deactivated, so that the pMOS transistor 10 is turned off. Further, the operational amplifier 9 is activated so that an output NDRV of the operational amplifier 9 becomes HIGH. Since the nMOS transistor 13 is turned off, the nMOS transistor 11 is turned on. In this case, therefore, the output signal OUT is at the LOW level.

If the capacitor 14 was not provided, the output signal OUT would fall immediately when the NMOS transistor 11 is turned on. Because of presence of the capacitor 14, however, the falling time Tf of the output signal OUT becomes longer as electric charge is supplied from the capacitor 14.

This will be described in terms of a flow of an electric current. When both the driver input PEN and the driver input NEN are LOW, a current In1 is generated by charge supplied to the non-inverted-input node of the operational amplifier 9, and a current Ic2 is generated by charge supplied to the capacitor 14. The current In1 and the current Ic2 flow through the pMOS transistors 4 and 5.

The amount of current Ip2 that can flow through the pMOS transistors 4 and 5 is limited by the turned-on resistance of the PMOS transistor 4, i.e., limited by the voltage VP. Because of this, only a limited amount of a current, which is less than a current Ifb2 combining the current In1 and the current Ic2, can flow through the PMOS transistors 4 and 5 from the VDD power line. As a result, the non-inverted-input node of the operational amplifier 9 does not exhibit a rapid voltage rise, so that the nMOS transistor 11 is turned on gradually. This elongates the falling time Tf of the output signal OUT.

In this manner, the falling time Tf of the output signal OUT of the output-buffer circuit can be adjusted by controlling the voltage VP which is applied to the gate of the pMOS transistor 4. The control of the voltage VP can be effected by changing the resistances of the resistors 17 and 18 in the bias circuit 3.

When the driver input PEN is LOW and the driver input NEN is HIGH (not shown), the operational amplifier 8 is deactivated, and the pMOS transistor 12 is turned on, so that the pMOS transistor 10 is turned off. Further, the operational amplifier 9 is deactivated, and the nMOS transistor 13 is turned on, so that the nMOS transistor 11 is turned off. In this case, the output is put in a high-impedance state.

In the related-art output-buffer circuit as shown in FIG. 9, the voltage VCNTR supplied to the inverted-input node of the operational amplifiers 8 and 9 is dependent on the resistance of the resistor 17 and the resistor 18. In order to secure stable operations of the operational amplifiers 8 and 9 and insure stability of the output operations, the resistance of the resistor 17 and the resistance of the resistor 18 must be identical. If the resistances of the resistor 17 and the resistor 18 vary due to inconsistent manufacturing processes, stable operations cannot be insured for the operational amplifiers 8 and 9, resulting in insufficient stability of output operations. Under some conditions of temperature, power voltages, etc., the rising time Tr and the falling time Tf of the output signal OUT may stray from the range defined by the USB standard.

Use of the operational amplifiers 8 and 9 helps to insure reliable operations of the pMOS transistor 10 and the nMOS transistor 11 forming an output-transistor pair even when the current Ip1 and In1 are small. Use of two operational amplifiers 8 and 9, however, results in an increased number of circuit elements, which acts against a cost reduction. Also, amplification operations of the operational amplifiers 8 and 9 makes it difficult to adjust a through-rate.

Accordingly, there is a need for an output-buffer circuit of a through-rate-control type which can insure stable output operations even under the presence of manufacturing-process variations, and can be implemented by a decreased number of circuit elements to facilitate a cost reduction.

Further, there is a need for an output-buffer circuit of a through-rate-control type which can insure stable output operations even under the presence of manufacturing-process variations, and can be implemented by a decreased number of circuit elements to facilitate a cost reduction while allowing an easy adjustment to be made to a through rate.

SUMMARY OF THE INVENTION

Accordingly, it is a general object of the present invention to provide an output-buffer circuit which can satisfy the requirements described above.

It is another and more specific object of the present invention to provide an output-buffer circuit of a through-rate-control type which can insure stable output operations even under the presence of manufacturing-process variations, and can be implemented by a decreased number of circuit elements to facilitate a cost reduction.

It is still another object of the present invention to provide an output-buffer circuit of a through-rate-control type which can insure stable output operations even under the presence of manufacturing-process variations, and can be implemented by a decreased number of circuit elements to facilitate a cost reduction while allowing an easy adjustment to be made to a through rate.

According to a first aspect of the present invention, an output-buffer circuit includes a first output transistor connected between a first power line and an output node, a second output transistor connected between the output node and a second power line, an output-transistor control circuit which controls an on/off state of the first and second output transistors, and a capacitor for controlling a through-rate of an output signal output to the output node, wherein the output-transistor control circuit includes a pull-up circuit connected between the first power line and a given node, a pull-down circuit connected between the given node and the second power line, a first switch device connected between a gate of the first output transistor and the given node, a second switch device connected between the first power line and the gate of the first output transistor, a third switch device connected between a gate of the second output transistor and the given node, and a fourth switch device connected between the gate of the second output transistor and the second power line, wherein the capacitor is connected between the output node and the given node.

According to the first aspect of the present invention, there is no need to provide two operation amplifiers for driving the first and second output transistors, and the two switch devices provided instead achieve the intended function.

According to a second aspect of the present invention, the output-buffer circuit as described as the first aspect is such that the first output transistor includes a p-channel insulated-gate-type field-effect transistor which has a source thereof connected to the first power line and a drain thereof connected to the output node, and the second output transistor includes an n-channel insulated-gate-type field-effect transistor which has a source thereof connected to the second power line and a drain thereof connected to the output node, the first switch device, the first switch device including an n-channel insulated-gate-type field-effect transistor which has a drain thereof connected to the gate of the first output transistor and a source thereof connected to the given node, and has an on/off state thereof controlled by a first driver input, the second switch device including a p-channel insulated-gate-type field-effect transistor which has a drain thereof connected to the gate of the first output transistor and a source thereof connected to the first power line, and has an on/off state thereof controlled by the first driver input, the third switch device including a p-channel insulated-gate-type field-effect transistor which has a drain thereof connected to the gate of the second output transistor and a source thereof connected to the given node, and has an on/off state thereof controlled by a second driver input, and the fourth switch device including an n-channel insulated-gate-type field-effect transistor which has a drain thereof connected to the gate of the second output transistor and a source thereof connected to the second power line, and has an on/off state thereof controlled by the second driver input.

According to a third aspect of the present invention, the output-buffer circuit as described as the first aspect or the second aspect is such that the pull-up circuit includes a first variable-resistance device and a fifth switch device, the first variable-resistance device and the fifth switch device connected in series between the first power line and the given node, and wherein the pull-down circuit includes a sixth switch device, and a second variable-resistance device, the sixth switch device and the second variable-resistance device connected in series between the given node and the second power line.

According to a fourth aspect of the present invention, the output-buffer circuit as described as the third aspect is such that the first variable-resistance device includes a p-channel insulated-gate-type field-effect transistor which has a source thereof connected to the first power line and a gate thereof receiving a first fixed voltage, and the fifth switch device includes a p-channel insulated-gate-type field-effect transistor which has a source thereof connected to the drain of the p-channel insulated-gate-type field-effect transistor of the first variable-resistance device and a drain thereof connected to the given node, and has an on/off state thereof controlled by the second driver input, and wherein the sixth switch device includes an n-channel insulated-gate-type field-effect transistor which has a drain thereof connected to the given node, and has an on/off state thereof controlled by the first driver input, and the second variable-resistance device includes an n-channel insulated-gate-type field-effect transistor which has a drain thereof connected to the source of the n-channel insulated-gate-type field-effect transistor of the sixth switch device, a source thereof connected to the second power line, and a gate thereof receiving a second fixed voltage.

According to a fifth aspect of the present invention, the output-buffer circuit as described as the fourth aspect further includes a bias circuit which includes first through third potential-division elements connected in series between the first power line and the second power line, a joint point between the first and second potential-division elements generating the first fixed voltage, and a joint point between the second and third potential-division elements generating the second fixed voltage.

According to a sixth aspect of the present invention, the output-buffer circuit as described as the fifth aspect is such that the first potential-dividion element includes a p-channel insulated-gate-type field-effect transistor which has a source thereof connected to the first power line and a gate thereof connected to a drain thereof, and the second potential-division element includes a fixed resistor which has one end thereof connected to the drain of the p-channel insulated-gate-type field-effect transistor of the first potential-division element, the third potential-division element including an n-channel insulated-gate-type field-effect transistor which has a drain thereof connected to another end of the fixed resistor of the second potential-division element, a source thereof connected to the second power line, and a gate thereof connected to the drain thereof.

According to a seventh aspect of the present invention, the output-buffer circuit as described as the fifth aspect is such that the first potential-dividion element includes a p-channel insulated-gate-type field-effect transistor which has a source thereof connected to the first power line and a gate thereof connected to a drain thereof, and the second potential-division element includes a p-channel insulated-gate-type field-effect transistor which has a source thereof connected to the drain of the p-channel insulated-gate-type field-effect transistor of the first potential-division element and a gate thereof connected to the second power line, and includes an n-channel insulated-gate-type field-effect transistor which has a drain thereof connected to the drain of the p-channel insulated-gate-type field-effect transistor of the second potential-division element and a gate thereof connected to the first power line, the third potential-division element including an n-channel insulated-gate-type field-effect transistor which has a drain thereof connected to a source of the n-channel insulated-gate-type field-effect transistor of the second potential-division element, a source thereof connected to the second power line, and a gate thereof connected to the drain thereof.

According to the seventh aspect of the present invention, the bias circuit is comprised only of insulated-gate-type field-effect transistors, so that adjustment of a rising time and a falling time of the output signal can be easily made by controlling gate lengths and/or gate widths of the insulated-gate-type field-effect transistors constituting the bias circuit.

Further, even if the turned-on resistances of the p-channel insulated-gate-type field-effect transistors become smaller and the turned-on resistances of the n-channel insulated-gate-type field-effect transistors become larger due to manufacturing-process variations, or even if the turned-on resistances of the p-channel insulated-gate-type field-effect transistors become larger and the turned-on resistances of the n-channel insulated-gate-type field-effect transistors become smaller, a combined turned-on resistance of the p-channel insulated-gate-type field-effect transistor and the n-channel insulated-gate-type field-effect transistor together forming the second potential-division element can be confined in a relatively small variation range. The first and second fixed voltages are thus stable.

According to an eighth aspect of the present invention, the output-buffer circuit as described as the third aspect is such that the first variable-resistance device includes a p-channel insulated-gate-type field-effect transistor which has a source thereof connected to the first power line and a gate thereof receiving a fixed voltage, and the fifth switch device includes a p-channel insulated-gate-type field-effect transistor which has a source thereof connected to the drain of the p-channel insulated-gate-type field-effect transistor of the first variable-resistance device and a drain thereof connected to the given node, and has an on/off state thereof controlled by the second driver input, wherein the sixth switch device includes an n-channel insulated-gate-type field-effect transistor which has a drain thereof connected to the given node, and has an on/off state thereof controlled by the first driver input, and the second variable-resistance device includes an n-channel insulated-gate-type field-effect transistor which has a drain thereof connected to the source of the n-channel insulated-gate-type field-effect transistor of the sixth switch device, a source thereof connected to the second power line, and a gate thereof receiving the fixed voltage.

According to a ninth aspect of the present invention, the output-buffer circuit as described as the eighth aspect further includes a bias circuit which includes first through fourth potential-division elements connected in series between the first power line and the second power line, a joint point between the second and third potential-division elements generating the fixed voltage.

According to a tenth aspect of the present invention, the output-buffer circuit as described as the fifth aspect is such that the first potential-dividion element includes a p-channel insulated-gate-type field-effect transistor which has a source thereof connected to the first power line and a gate thereof connected to a drain thereof, and the second potential-division element includes a fixed resistor which has one end thereof connected to the drain of the p-channel insulated-gate-type field-effect transistor of the first potential-division element, and wherein the third potential-division element includes a fixed resistor which has one end thereof connected to another end of the fixed resistor of the second potential-division element, and the fourth potential-division element includes an n-channel insulated-gate-type field-effect transistor which has a drain thereof connected to another end of the fixed resistor of the third potential-division element, a source thereof connected to the second power line, and a gate thereof connected to the drain thereof.

According to an eleventh aspect of the present invention, the output-buffer circuit as described as the ninth aspect is such that the first potential-division element includes a p-channel insulated-gate-type field-effect transistor which has a source thereof connected to the first power line and a gate thereof connected to a drain thereof, and the second potential-division element includes a p-channel insulated-gate-type field-effect transistor which has a source thereof connected to the drain of the p-channel insulated-gate-type field-effect transistor of the first potential-division element and a gate thereof connected to the second power line, and wherein the third potential-division element includes an n-channel insulated-gate-type field-effect transistor which has a drain thereof connected to the drain of the p-channel insulated-gate-type field-effect transistor of the second potential-division element and a gate thereof connected to the first power line, and the fourth potential-division element including an n-channel insulated-gate-type field-effect transistor which has a drain thereof connected to a source of the n-channel insulated-gate-type field-effect transistor of the third potential-division element, a source thereof connected to the second power line, and a gate thereof connected to the drain thereof.

According to the eleventh aspect of the present invention, if the turned-on resistances of the p-channel insulated-gate-type field-effect transistors become smaller and the turned-on resistances of the n-channel insulated-gate-type field-effect transistors become larger due to manufacturing-process variations, a turned-on resistance of the p-channel insulated-gate-type field-effect transistor serving as the first variable-resistance device is relatively small while the turned-on resistance of the n-channel insulated-gate-type field-effect transistor serving as the second variable-resistance device is relatively large. Since the p-channel insulated-gate-type field-effect transistors of the first and second potential-division elements have decreased resistance and the n-channel insulated-gate-type field-effect transistors of the third and fourth potential-division elements have increased resistance, however, the fixed voltage is increased, which serves as an offsetting force to make the turned-on resistance of the p-channel insulated-date-type field-effect transistor of the first variable-resistance device larger and the turned-on resistance of the n-channel insulated-gate-type field-effect transistor of the second variable-resistance device smaller.

Conversely, if the turned-on resistances of the p-channel insulated-gate-type field-effect transistors become larger and the turned-on resistances of the n-channel insulated-gate-type field-effect transistors become smaller due to manufacturing-process variations, a turned-on resistance of the p-channel insulated-gate-type field-effect transistor serving as the first variable-resistance device is relatively large while the turned-on resistance of the n-channel insulated-gate-type field-effect transistor serving as the second variable-resistance device is relatively small. Since the p-channel insulated-gate-type field-effect transistors of the first and second potential-division elements have increased resistance and the n-channel insulated-gate-type field-effect transistors of the third and fourth potential-division elements have decreased resistance, however, the fixed voltage is decreased, which serves as an offsetting force to make the turned-on resistance of the p-channel insulated-gate-type field-effect transistor of the first variable-resistance device smaller and the turned-on resistance of the n-channel insulated-gate-type field-effect transistor of the second variable-resistance device larger.

Accordingly, even when the turned-on resistances of the p-channel insulated-gate-type field-effect transistors and the n-channel insulated-gate-type field-effect transistors are varied due to manufacturing-process variations, the p-channel insulated-gate-type field-effect transistor of the first variable-resistance device and the n-channel insulated-gate-type field-effect transistor of the second variable-resistance device will have an electric current flowing therethrough having a relatively small variation.

According to a thirteenth aspect of the present invention, an output-buffer circuit includes a first output transistor connected between a first power line and an output node, a second output transistor connected between the output node and a second power line, an output-transistor control circuit which includes first and second driving transistors to control an on/off state of the first and second output transistors, respectively, the first and second driving transistors having a respective current passing therethrough which drives the first and second output transistors, respectively, and a capacitor for controlling a through-rate of an output signal output to the output node.

According to the thirteenth aspect of the present invention, there is no need to provide two operation amplifiers for driving the first and second output transistors, and the two driving transistors provided instead achieve the intended function.

Other objects and further features of the present invention will be apparent from the following detailed description when read in conjunction with the accompanying drawings.

DESCRIPTION OF THE PREFERRED EMBODIMENTS

In the following, first through fourth embodiments of the present invention will be described with reference to FIG. 1 through FIG. 8.

Figure 1:
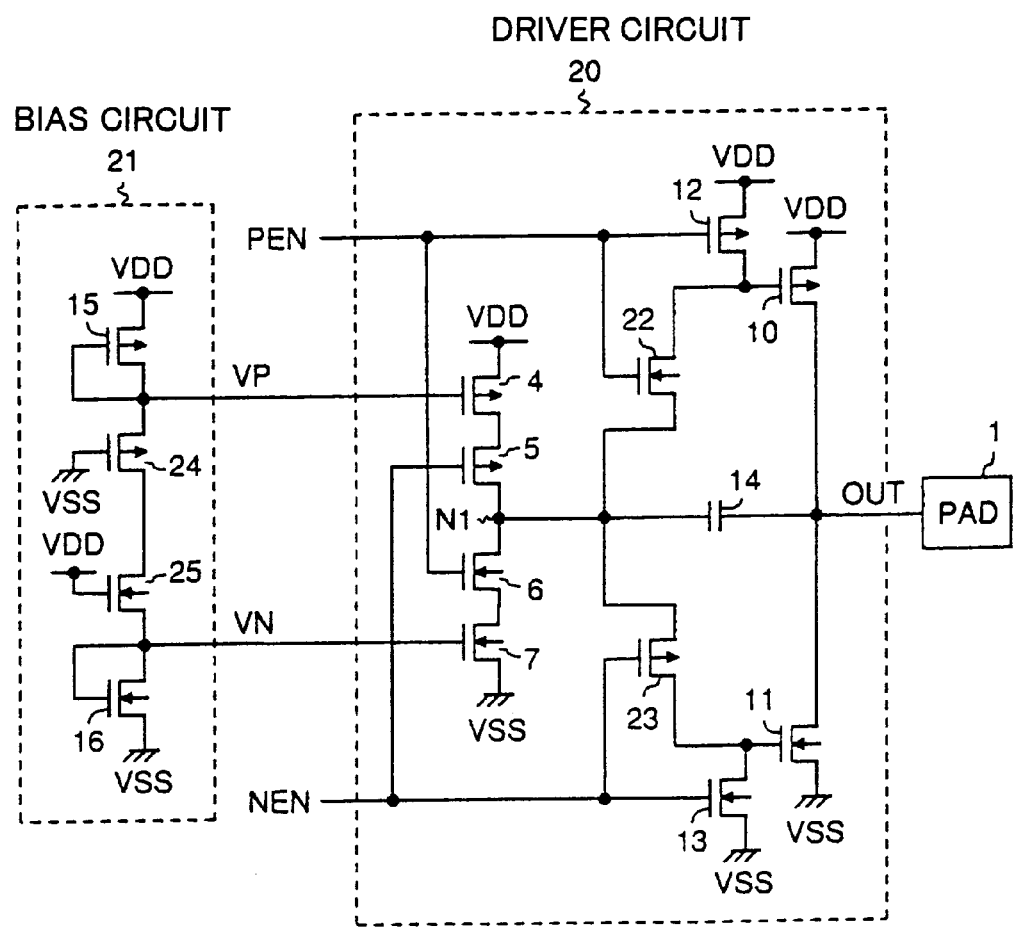
FIG. 1 is a circuit diagram showing a configuration of a first embodiment of the present invention.
Figure 2:
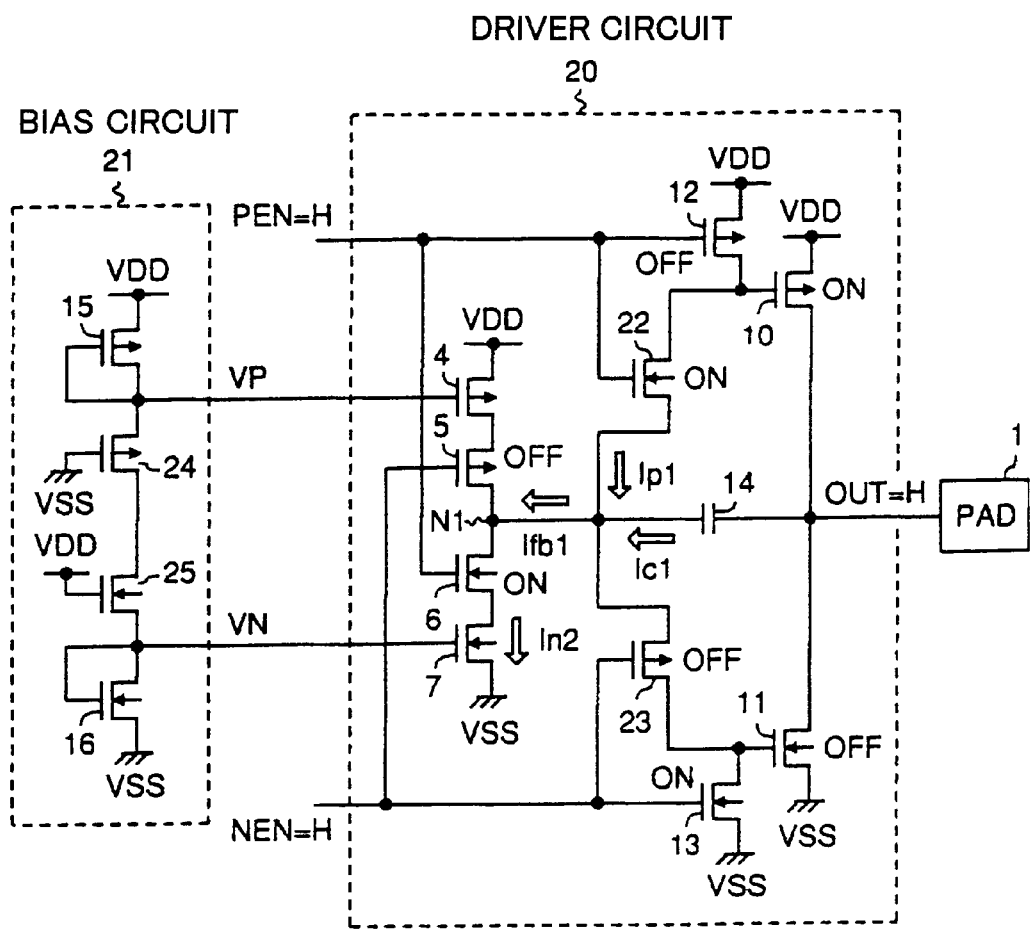
FIG. 2 is a circuit diagram for explaining operations of the first embodiment of the present invention.
Figure 3:
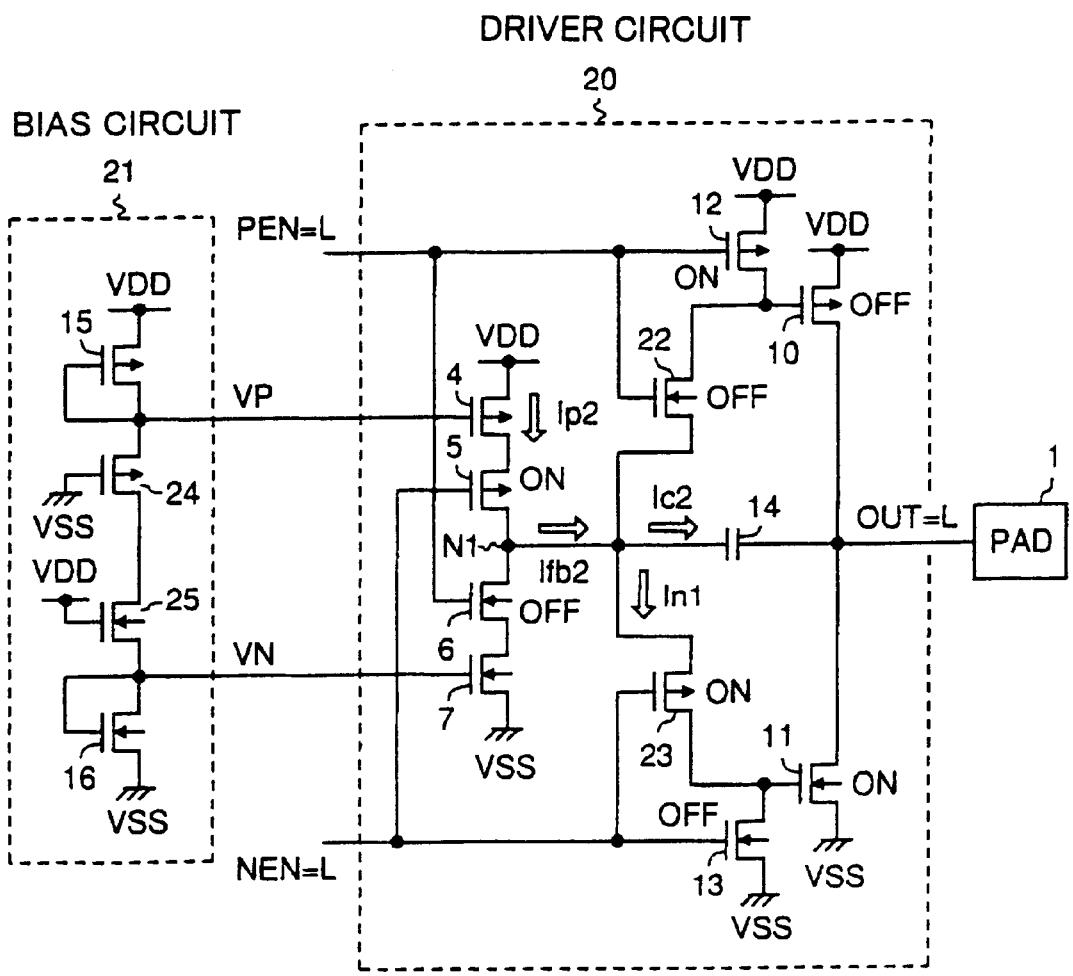
FIG. 3 is a circuit diagram for explaining operations of the first embodiment of the present invention.

First Embodiment, FIGS. 1–3

FIG. 1 is a circuit diagram showing a configuration of a first embodiment of the present invention. FIG. 1 shows a driver circuit 20 for supplying an output signal OUT to the pad 1 serving as an output terminal in response to driver inputs PEN and NEN, and a bias circuit 21 for supplying voltages VP and VN (<VP) to the driver circuit 21.

Figure 9:
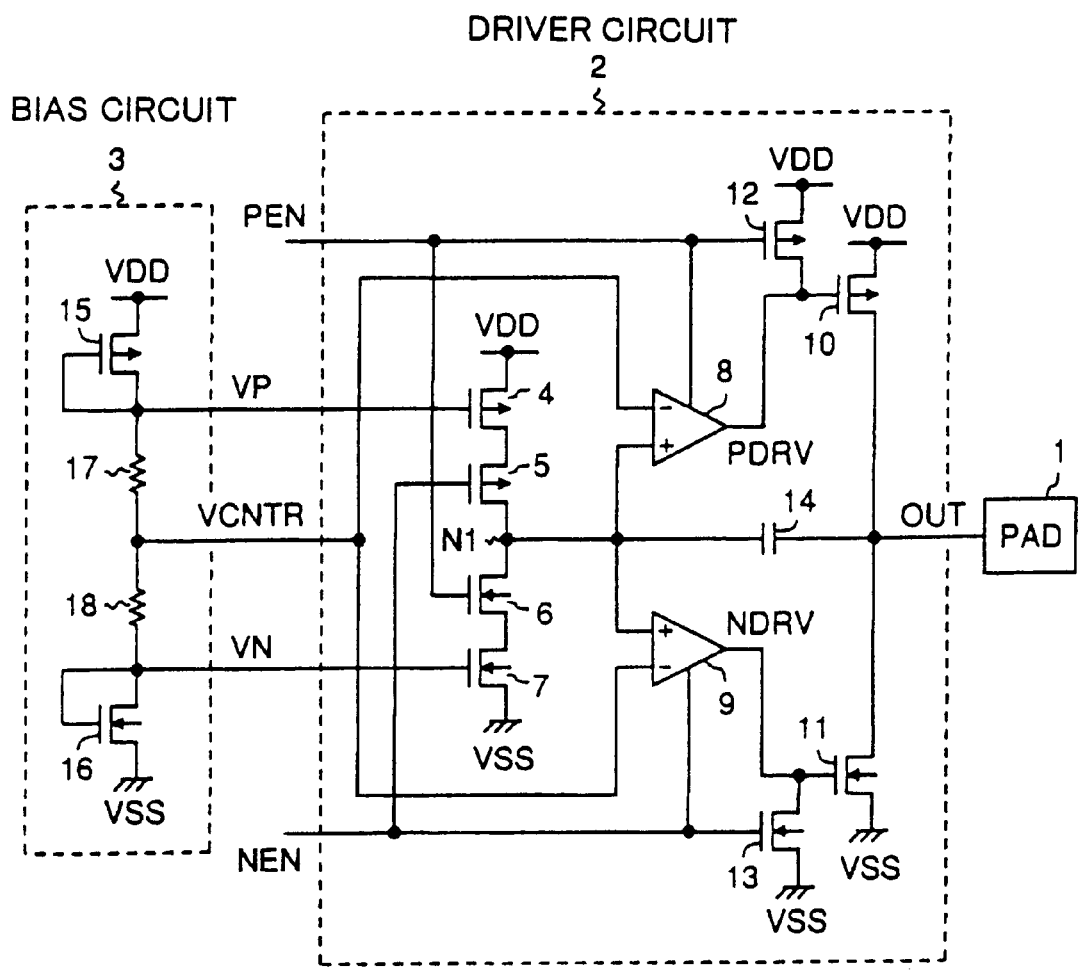
FIG. 9 is a circuit diagram showing an example of a configuration of a related-art output-buffer circuit.
Figure 10:
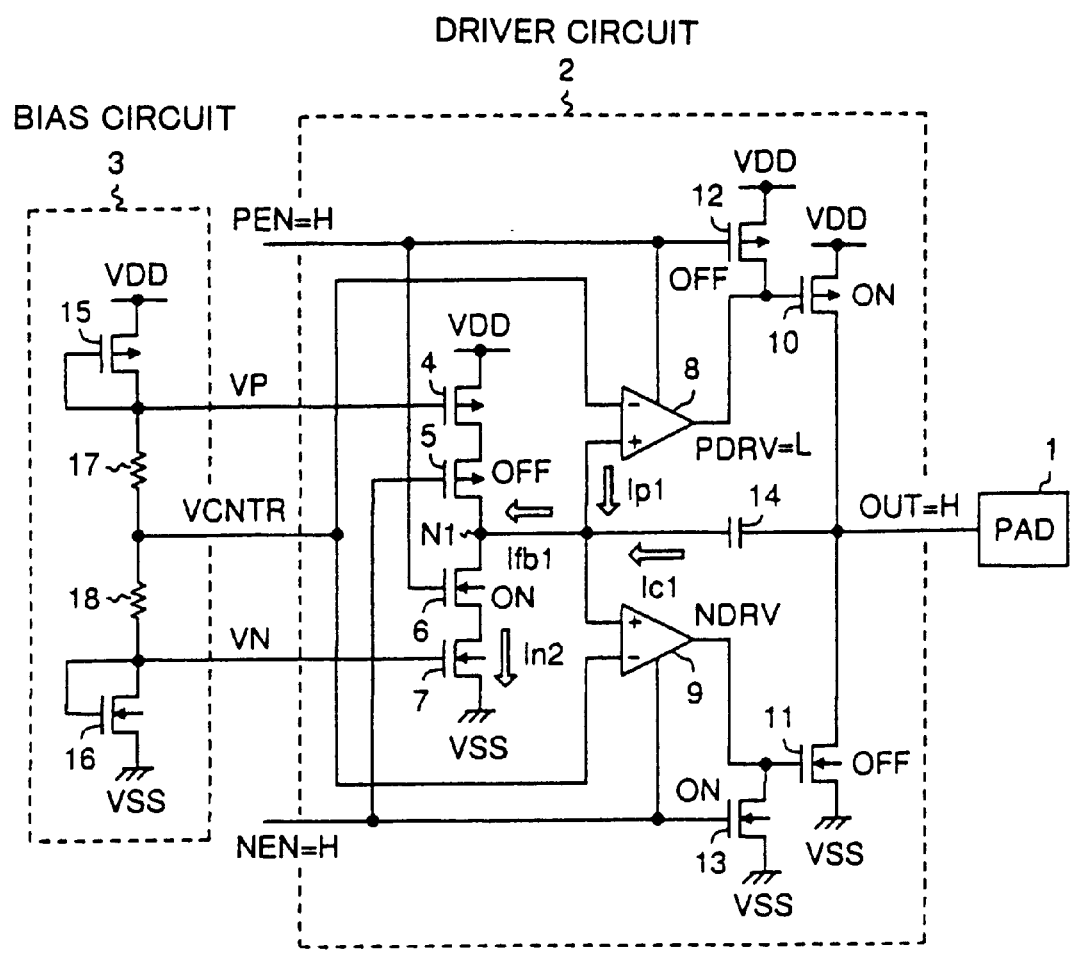
FIG. 10 is a circuit diagram for explaining operations of the related-art output-buffer circuit shown in FIG. 9.
Figure 11:
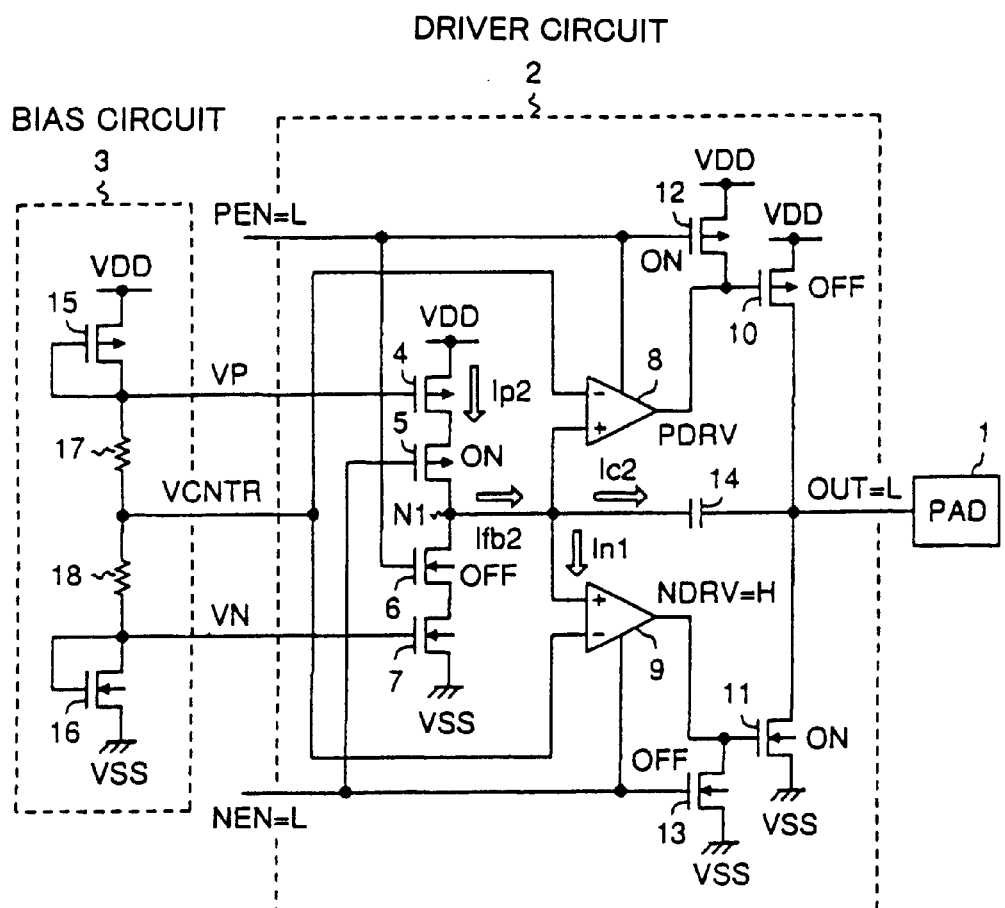
FIG. 11 is a circuit diagram for explaining operations of the related-art output-buffer circuit shown in FIG. 9.

The driver circuit 20 is provided with an nMOS transistor 22 and a pMOS transistor 23 in place of the operation amplifiers 8 and 9, respectively, which are provided in the driver circuit 2 of the related-art output-buffer circuit shown in FIG. 9. Except for this difference, the driver circuit 20 has the same configuration as the driver circuit 2.

The nMOS transistor 22 has a drain thereof connected to the gate of the pMOS transistor 10, a source thereof connected to the node N1, and a gate thereof receiving the driver input PEN. A turned-on/off conditions of the nMOS transistor 22 is controlled by the driver input PEN.

The pMOS transistor 23 has a source thereof connected to the node N1, a drain thereof connected to the gate of the nMOS transistor 11, and a gate thereof connected to receive the driver input NEN. The driver input NEN controls the pMOS transistor 23 to be turned on/off.

In the first embodiment of the present invention, the pMOS transistors 4, 5, 12, and 23 and the nMOS transistors 6, 7, 13, and 22 together form an output-transistor-control circuit.

In the bias circuit 21, a pMOS transistor 24 and an nMOS transistor 25 are provided in place of the resistors 17 and 18 in contrast to the bias circuit 3 of the related-art output-buffer circuit shown in FIG. 9. Other configurations are the same between the bias circuit 21 and the bias circuit 3.

The pMOS transistor 24 has a source thereof connected to the drain of the pMOS transistor 15 and a gate thereof connected to the VSS power line. The nMOS transistor 25 has a drain thereof connected to the drain of the pMOS transistor 24, a gate thereof connected to the VDD power line, and a source thereof connected to the drain of the nMOS transistor 16.

In the first embodiment of the present invention having a configuration as described above, the pMOS transistor 5 and the NMOS transistor 6 are turned off and on, respectively, when both of the driver inputs PEN and NEN are HIGH as shown in FIG. 2. In this case, the voltage at the node N1 becomes LOW.

Also, the pMOS transistor 12 is turned off, and the nMOS transistor 22 is turned on, so that the pMOS transistor 10 is turned on. Further, the pMOS transistor 23 is turned off, and the nMOS transistor 13 is turned on, so that the nMOS transistor 11 is turned off. The output signal OUT is thus at the HIGH level.

If the capacitor 14 was not provided, the output signal OUT would rise immediately when the pMOS transistor 10 is turned on. Because of presence of the capacitor 14, however, the rising time Tr of the output signal OUT becomes longer as the capacitor 14 initially holds electric charge.

This will be described in terms of a flow of an electric current. When both the driver input PEN and the driver input NEN are HIGH, a current Ip1 is generated via discharging of the gate of the PMOS transistor 10, and a current Ic1 is generated by charge supplied from the capacitor 14. The current Ip1 and the current Ic1 flow into the VSS power line via the nMOS transistors 6 and 7.

The amount of current In2 that can flow through the nMOS transistors 6 and 7 is limited by the turned-on resistance of the nMOS transistor 7, i.e., limited by the voltage VN. Because of this, only a limited amount of a current, which is less than a current Ifb1 combining the current Ip1 and the current Ic1, can flow through the nMOS transistors 6 and 7 to the VSS power line. As a result, the gate of the PMOS transistor 10 does not exhibit a rapid voltage drop, so that the pMOS transistor 10 is turned on gradually. This elongates the rising time Tr of the output signal OUT.

In this manner, the rising time Tr of the output signal OUT of the output-buffer circuit can be adjusted by controlling the voltage VN which is applied to the gate of the nMOS transistor 7. The control of the voltage VN can be effected by changing the turned-on resistances of the nMOS transistors 16 and 25 in the bias circuit 21, which is achieved by changing gate lengths and gate widths of the nMOS transistors 16 and 25.

When both the driver input PEN and the driver input NEN are LOW, as shown in FIG. 3, the pMOS transistor 5 and the NMOS transistor 6 are turned on and off, respectively, so that the voltage at the node N1 becomes HIGH.

Also, the nMOS transistor 22 is turned off, and the pMOS transistor 12 is turned on, so that the PMOS transistor 10 is turned off. Further, the nMOS transistor 13 is turned off, and the pMOS transistor 23 is turned on, so that the nMOS transistor 11 is turned on. In this case, therefore, the output signal OUT is at the LOW level.

If the capacitor 14 was not provided, the output signal OUT would fall immediately when the nMOS transistor 11 is turned on. Because of presence of the capacitor 14, however, the falling time Tf of the output signal OUT becomes longer as electric charge is supplied from the capacitor 14.

This will be described in terms of a flow of an electric current. When both the driver input PEN and the driver input NEN are LOW, a current In1 is generated by charge supplied to the gate of the nMOS transistor 11 via the pMOS transistors 4 and 5 and the pMOS transistor 23, and a current Ic2 is generated by charge supplied to the capacitor 14 via the pMOS transistors 4 and 5.

The amount of current Ip2 that can flow through the pMOS transistors 4 and 5 is limited by the turned-on resistance of the pMOS transistor 4, i.e., limited by the voltage VP. Because of this, only a limited amount of a current, which is less than a current Ifb2 combining the current In1 and the current Ic2, can flow through the pMOS transistors 4 and 5 from the VDD power line. As a result, the gate of the nMOS transistor 11 does not exhibit a rapid voltage rise, so that the nMOS transistor 11 is turned on gradually. This elongates the falling time Tf of the output signal OUT.

In this manner, the falling time Tf of the output signal OUT of the output-buffer circuit can be adjusted by controlling the voltage VP which is applied to the gate of the pMOS transistor 4. The control of the voltage VP can be effected by changing the resistances of the pMOS transistors 15 and 24 in the bias circuit 21, which is achieved by changing gate lengths and gate widths of the pMOS transistors 15 and 24.

When the driver input PEN is LOW and the driver input NEN is HIGH (not shown), the NMOS transistor 22 is turned off, and the pMOS transistor 12 is turned on, so that the pMOS transistor 10 is turned off. Further, the pMOS transistor 23 is turned off, and the nMOS transistor 13 is turned on, so that the nMOS transistor 11 is turned off. In this case, the output is put in a high-impedance state.

According to the first embodiment of the present invention as described above, the pMOS transistor 10 serving as an output transistor is driven by the nMOS transistor 22 rather than driven by the operational amplifier 8 as in the related art, and the nMOS transistor 11 serving as an output transistor is driven by the pMOS transistor 23 rather than driven by the operational amplifier 9 as in the related art. This helps to achieve a cost reduction by reducing a number of circuit elements. Since there are no operational amplifiers 8 and 9 which could exhibit unstable operations if the voltage VCNTR varies, stable output operations are insured even when there are manufacturing-process variations.

Even if the turned-on resistances of the PMOS transistors become smaller and the turned-on resistances of the nMOS transistors become larger due to manufacturing-process variations, or even if the turned-on resistances of the pMOS transistors become larger and the turned-on resistances of the nMOS transistors become smaller, a combined turned-on resistance of the PMOS transistor 24 and the nMOS transistor 25 can be confined in a relatively small variation range. The voltages VP and VN are thus stable, thereby stabilizing the rising time Tr and the falling time Tf of the output signal OUT.

The bias circuit 21 is comprised of the pMOS transistors 15 and 24 and the nMOS transistors 16 and 25, and no resistors of fixed resistance is used. The voltages VP and VN for adjusting the rising time Tr and the falling time Tf can be easily changed by controlling gate lengths and/or gate widths of the pMOS transistors 15 and 24 and the NMOS transistors 16 and 25. Namely, an adjustment of the rising time Tr and the falling time Tf of the output signal OUT can be easily made. Further, since no fixed resistor is used, all the elements except for the capacitor 14 can be implemented via MOS transistors. This contributes to a cost reduction.

Use of the pMOS transistor 24 and the nMOS transistor 25 in the first embodiment of the present invention is not an absolute requirement, and fixed resistors may be used instead of the pMOS transistor 24 and the nMOS transistor 25. In this case, such benefits of the first embodiment as stabilization of the voltages VP and VN and an easy adjustment of the rising time Tr and the falling time Tf of the output signal OUT are lost. At least, however, a cost reduction based on a reduction in the number of circuit elements can be achieved. Further, the operational amplifiers 8 and 9, which are a source of unstable operations when a variation of the voltage VCNTR is present, are not used. This insures stable output operations even when manufacturing-process variations are present.

Figure 4:
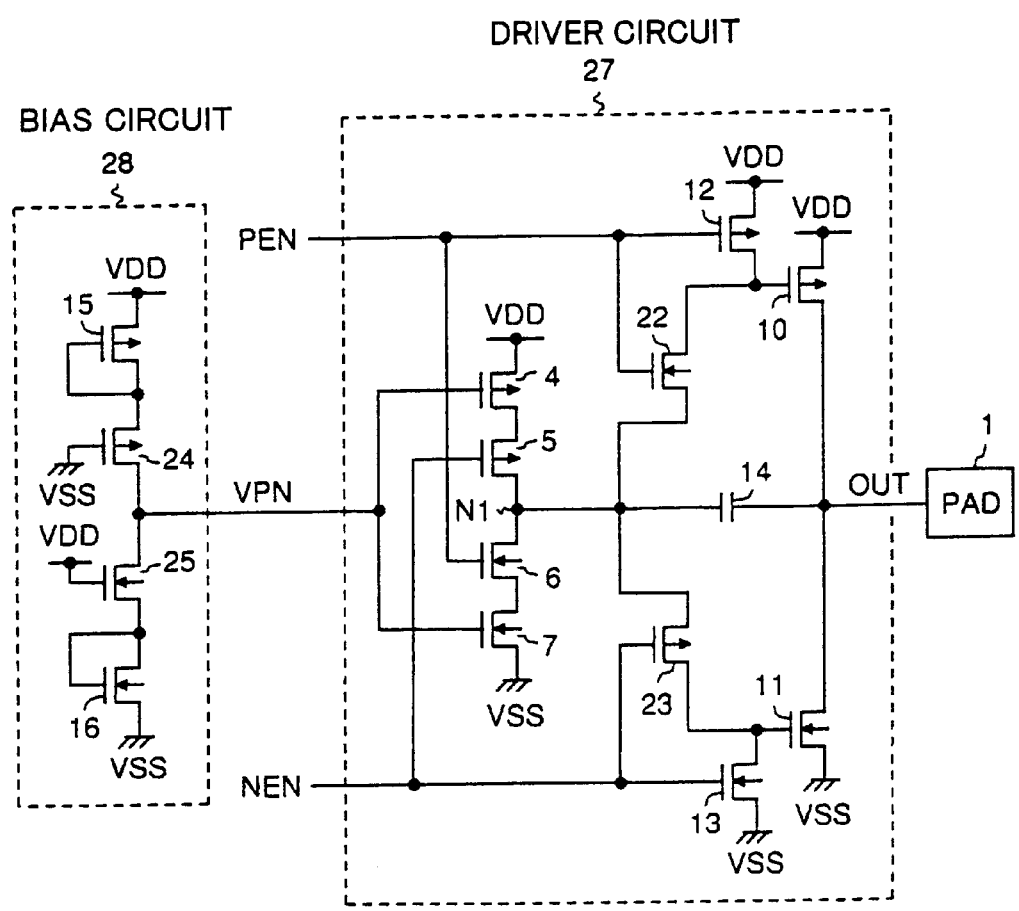
FIG. 4 is a circuit diagram showing a configuration of a second embodiment of the present invention.
Figure 5:
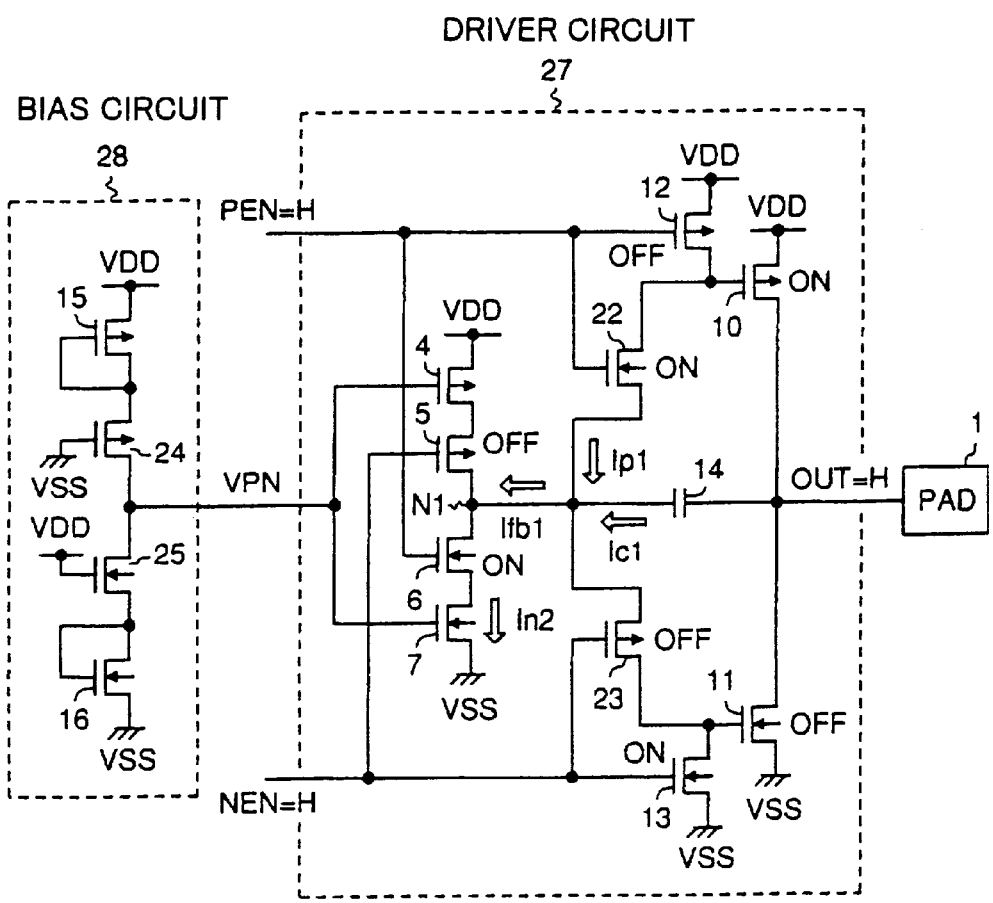
FIG. 5 is a circuit diagram for explaining operations of the second embodiment of the present invention.
Figure 6:
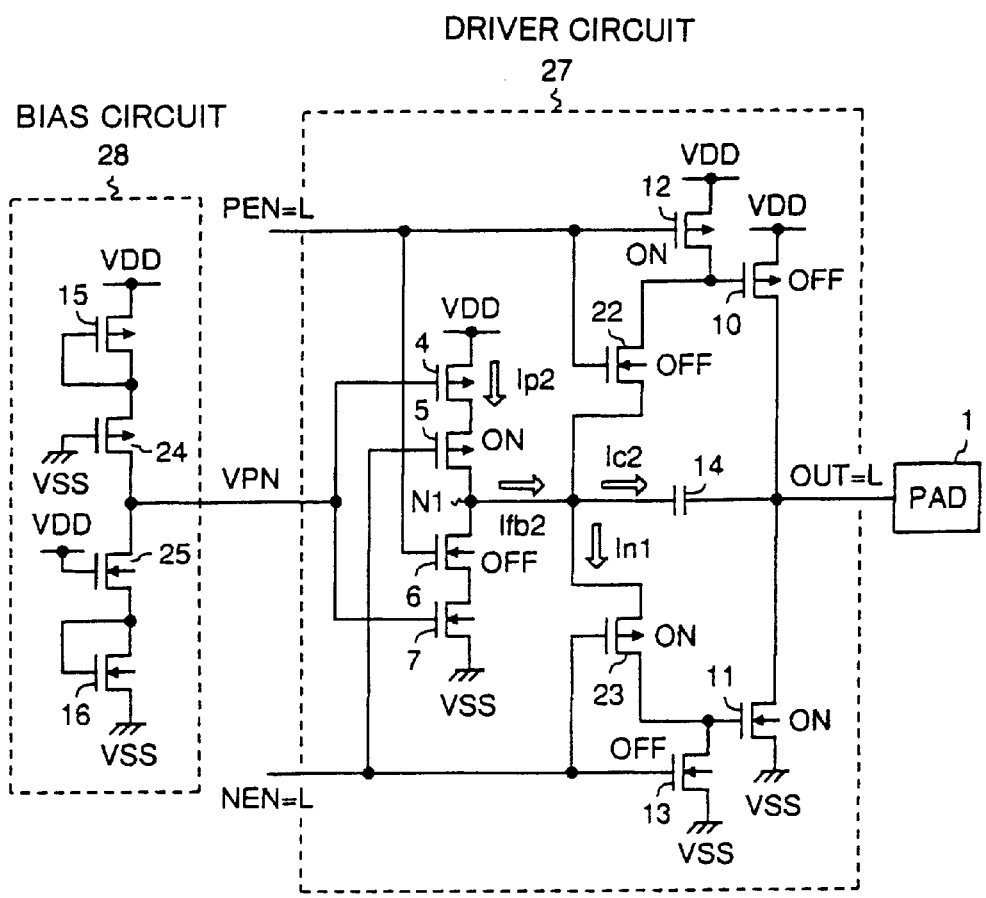
FIG. 6 is a circuit diagram for explaining operations of the second embodiment of the present invention.

Second Embodiment, FIGS. 4–6

FIG. 4 is a circuit diagram showing a configuration of a second embodiment of the present invention. FIG. 4 shows a driver circuit 27 for supplying an output signal OUT to the pad 1 serving as an output terminal in response to driver inputs PEN and NEN, and a bias circuit 28 for supplying a voltage VPN to the driver circuit 27.

The driver circuit 20 of the first embodiment of the present invention, as shown in FIG. 1, includes the pMOS transistor 4 receiving the voltage VP at the gate thereof and the nMOS transistor 7 receiving the voltage VN at the gate thereof. In the driver circuit 27, the gate of the pMOS transistor 4 is connected to the gate of the nMOS transistor 7, and the combined gates receive a common voltage VPN. Except this modification, the driver circuit 27 has the same configuration as that driver circuit 20.

The bias circuit 21 of the first embodiment of the present invention, as shown in FIG. 1, supplies the voltage VP of the drain of the pMOS transistor 15 to the gate of the pMOS transistor 4, and supplies the voltage VN of the drain of the nMOS transistor 16 to the gate of the nMOS transistor 7. In contrast, the bias circuit 28 obtains the voltage VPN at a joint point between the drain of the pMOS transistor 24 and the drain of the nMOS transistor 25, and supplies the voltage VPN to the gates of the pMOS transistor 4 and the nMOS transistor 7. As for other configurations, the bias circuit 28 is the same as the bias circuit 21.

In the second embodiment having a configuration as shown above, as shown in FIG. 5, the output signal OUT becomes HIGH when both the driver input PEN and the driver input NEN are HIGH, creating the same result as the first embodiment. Further, the rising time Tr of the output signal OUT can be elongated as in the first embodiment of the present invention.

As shown in FIG. 6, when both the driver input PEN and the driver input NEN are LOW, the output signal OUT becomes LOW as in the first embodiment of the present invention. Also, the falling time Tr of the output signal OUT can be elongated similarly to the present invention.

Further, when the driver input PEN is LOW and the driver input NEN are HIGH (not shown), the output shows a high impedance state as in the first embodiment of the present invention.

According to the second embodiment of the present invention as described above, the pMOS transistor 10 serving as an output transistor is driven by the nMOS transistor 22 rather than driven by the operation amplifier 8 as in the related art, and the nMOS transistor 11 serving as an output transistor is driven by the pMOS transistor 23 rather than driven by the operation amplifier 9 as in the related art. This configuration is the same as in the first embodiment, and helps to achieve a cost reduction by reducing a number of circuit elements. Since there are no operation amplifiers 8 and 9 which could exhibit unstable operations if the voltage VCNTR varies, stable output operations are insured even when there are manufacturing-process variations.

If the turned-on resistances of the pMOS transistors become smaller and the turned-on resistances of the nMOS transistors become larger due to manufacturing-process variations, a turned-on resistance of the pMOS transistor 4 is relatively small while the turned-on resistance of the nMOS transistor 7 is relatively large. Since the voltage VPN increases in this case, however, this increase in the voltage VPN functions as an offsetting force to make the turned-on resistance of the pMOS transistor 4 larger and the turned-on resistance of the nMOS transistor 7 smaller.

Conversely, if the turned-on resistances of the pMOS transistors become larger and the turned-on resistances of the nMOS transistors become smaller due to manufacturing-process variations, a turned-on resistance of the pMOS transistor 4 is relatively large while the turned-on resistance of the nMOS transistor 7 is relatively small. Since the voltage VPN decreases in this case, however, this decrease in the voltage VPN functions as an offsetting force to make the turned-on resistance of the pMOS transistor 4 smaller and the turned-on resistance of the nMOS transistor 7 larger.

Accordingly, the second embodiment of the present invention can suppress variations of the current Ip2 and In2 when the turned-on resistances of the pMOS transistors and the nMOS transistors are varied due to manufacturing-process variations. This contributes to stabilization of the rising time Tr and the falling time Tf of the output signal OUT.

In the second embodiment of the present invention, no fixed resistor is used, so that all the elements except for the capacitor 14 can be implemented via MOS transistors. This contributes to a cost reduction.

In the second embodiment of the present invention, the gate voltage of the pMOS transistor 4 is lower than that of the first embodiment, and the gate voltage of the nMOS transistor 7 is higher than that of the first embodiment. Because of this, the turned-on resistances of the pMOS transistor 4 and the nMOS transistor 7 are smaller, resulting in a shorter rising time Tr and a shorter falling time Tf of the output signal OUT. This may create a case in which the USB standard is not satisfied. This problem, however, is easy to overcome by elongating the gate lengths of the pMOS transistors 4, 15, and 24 and the nMOS transistors 7, 16, and 25.

Use of the pMOS transistor 24 and the nMOS transistor 25 in the second embodiment of the present invention is not an absolute requirement, and fixed resistors may be used instead of the pMOS transistor 24 and the nMOS transistor 25. In this case, such a benefit of the second embodiment as stabilization of the voltage VPN is lost. At least, however, a cost reduction based on a reduction in the number of circuit elements can be achieved. Further, the operation amplifiers 8 and 9, which are a source of unstable operations when a variation of the voltage VCNTR is present, are not used. This insures stable output operations even when manufacturing-process variations are present.

Figure 7:
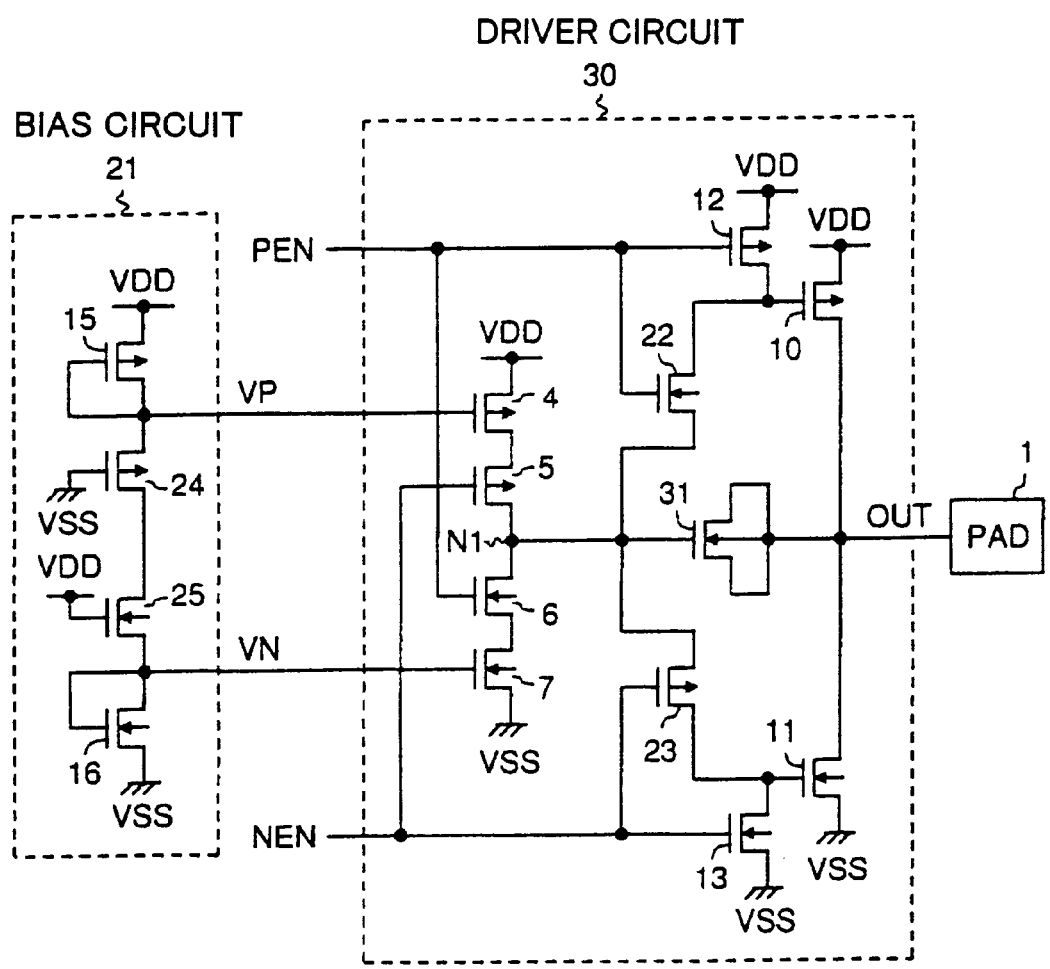
FIG. 7 is a circuit diagram showing a configuration of a third embodiment of the present invention.

Third Embodiment, FIG. 7

FIG. 7 is a circuit diagram showing a configuration of a third embodiment of the present invention. The third embodiment of the present invention includes a driver circuit 30 which is different from the driver circuit 20 of the first embodiment shown in FIG. 1. Except for this, the third embodiment has the same configuration as the first embodiment.

The driver circuit 30 includes a capacitor 31 which is formed from a plurality of gate capacitances of nMOS transistors connected together in parallel (the plurality of nMOS transistors are combined together and shown as a single nMOS transistor in FIG. 7). The capacitor 31 is provided in place of the capacitor 14 of the driver circuit 20 of the first embodiment. Other than this difference, the driver circuit 30 has the same configuration as the driver circuit 20 of the first embodiment.

According to the third embodiment of the present invention, a cost reduction is achieved by employing a fewer number of circuit elements, and the rising time Tr and the falling time Tf of the output signal OUT are easily adjusted and stabilized in the same manner as in the first embodiment of the present invention. Further, since all the circuit elements can be implemented via MOS transistors, a further cost reduction can be made in comparison to the first embodiment of the present invention.

The number of gates of the nMOS transistors forming the capacitor 31 may be dependent on the employed manufacturing process, power voltages, and gate widths and gate lengths of other transistors.

In the third embodiment of the present invention, the capacitor 31 is implemented by connecting gates of NMOS transistors in parallel. Alternatively, such a capacitor may be implemented by connecting gates of pMOS transistors together in parallel.

Figure 8:
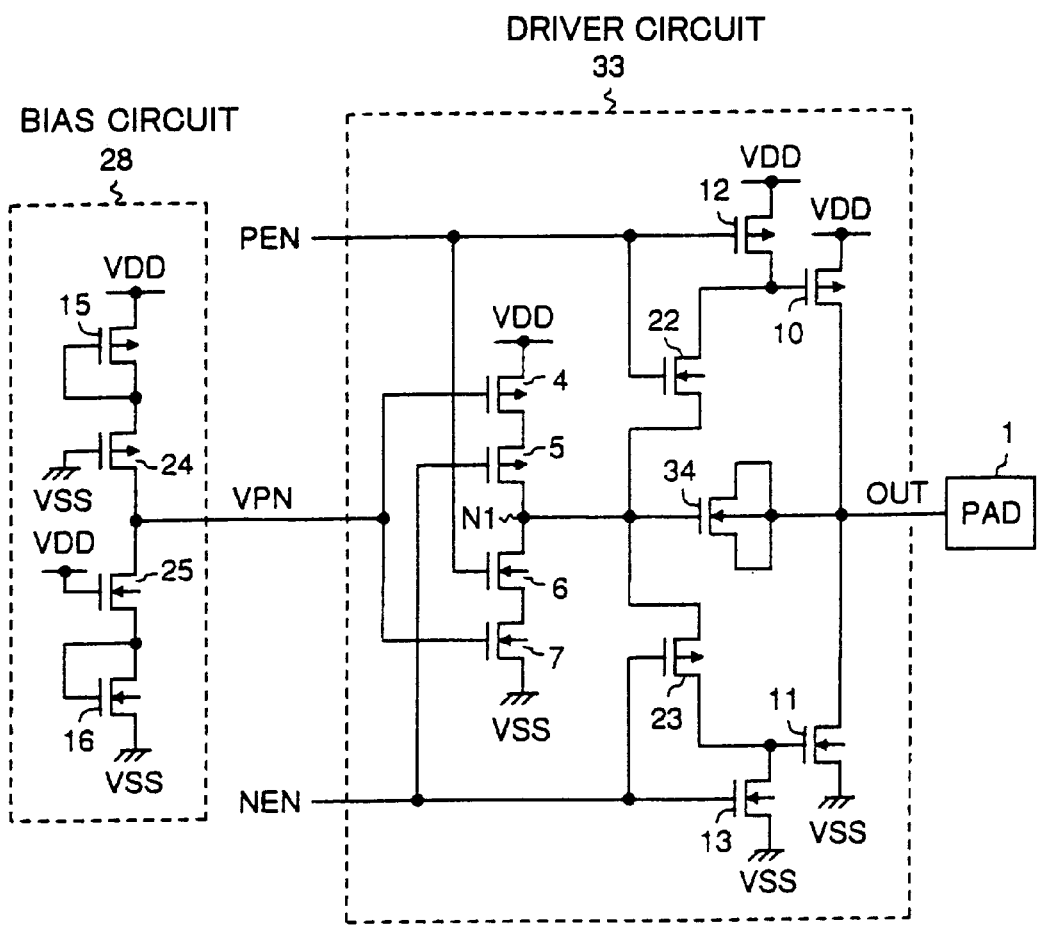
FIG. 8 is a circuit diagram showing a configuration of a fourth embodiment of the present invention.

Fourth Embodiment, FIG. 8

FIG. 8 is a circuit diagram showing a configuration of a fourth embodiment of the present invention. The fourth embodiment of the present invention includes a driver circuit 33 which is different from the driver circuit 27 of the second embodiment shown in FIG. 4. Except for this, the fourth embodiment has the same configuration as the second embodiment.

The driver circuit 33 includes a capacitor 34 which is formed from a plurality of gate capacitances of nMOS transistors connected together in parallel (the plurality of nMOS transistors are combined together and shown as a single nMOS transistor in FIG. 8). The capacitor 34 is provided in place of the capacitor 14 of the driver circuit 27 of the second embodiment. Other than this difference, the driver circuit 33 has the same configuration as the driver circuit 27 of the second embodiment.

According to the fourth embodiment of the present invention, a cost reduction is achieved by employing a fewer number of circuit elements, and the rising time Tr and the falling time Tf of the output signal OUT are easily adjusted and stabilized in the same manner as in the second embodiment of the present invention. Further, since all the circuit elements can be implemented via MOS transistors, a further cost reduction can be made in comparison to the second embodiment of the present invention.

The number of gates of the nMOS transistors forming the capacitor 34 may be dependent on the employed manufacturing process, power voltages, and gate widths and gate lengths of other transistors.

In the fourth embodiment of the present invention, the capacitor 34 is implemented by connecting gates of nMOS transistors in parallel.

Alternatively, such a capacitor may be implemented by connecting gates of pMOS transistors together in parallel.

According to the present invention described above, there is no need to provide two operation amplifiers for driving the two output transistors. Instead, two switch circuits are provided for the purpose of driving the output transistors. This configuration involves a smaller number of circuit elements, and, thus, achieves a cost reduction. Further, no need for operation amplifiers, which would exhibit unstable operation when a reference voltage supplied thereto varied, insures stable output operations even when there is a manufacturing-process variation.

Further, an adjustment of the rising time and the falling time of the output signal can be made by gate lengths and/or gate widths of the insulated-gate-type field-effect transistors making up the bias circuit. This allows an easy adjustment of the rising time and the falling time.

Further, the present invention is not limited to these embodiments, but various variations and modifications may be made without departing from the scope of the present invention.

The present application is based on Japanese priority application No. 10-216582 filed on Jul. 31, 1998, with Japanese Patent Office, the entire contents of which are hereby incorporated by reference.

What is claimed is:

1. An output-buffer circuit comprising:

a first output transistor connected between a first power line and an output node;

a second output transistor connected between the output node and a second power line;

an output-transistor control circuit which controls an on/off state of said first and second output transistors; and a capacitor for controlling a through-rate of an output signal output to the output node, wherein said output-transistor control circuit includes:

a pull-up circuit connected between the first power line and a given node;

a pull-down circuit connected between the given node and a second power line;

a first switch device connected between a gate of said first output transistor and the given node and having an on/off state thereof controlled by a first driver input;

a second switch device connected between the first power line and the gate of said first output transistor and having an on/off state thereof controlled by the first driver input;

a third switch device connected between a gate of said second output transistor and the given node and having an on/off state thereof controlled by a second driver input; and a fourth switch device connected between the gate of said second output transistor and the second power line and having an on/off state thereof controlled by the second driver input, wherein said capacitor is connected between the output and the given node.

2. The output-buffer circuit as claimed in claim 1, wherein said first output transistor includes a p-channel transistor which has a source thereof connected to the first power line and a drain thereof connected to the output node, and said second output transistor includes an n-channel transistor which has a source thereof connected to the second power line and a drain thereof connected to the output node, said first switch device including an n-channel transistor which has a drain thereof connected to the gate of said first output transistor and a source thereof connected to the given node, said second switch device including a p-channel transistor which has a drain thereof connected to the gate of said first output transistor and a source thereof connected to the first power line, said third switch device including a p-channel transistor which has a drain thereof connected to the gate of said second output transistor and a source thereof connected to the given node, and said fourth switch device including an n-channel transistor which has a drain thereof connected to the gate of said second output transistor and a source thereof connected to the second power line.

3. The output-buffer circuit as claimed in claim 2, wherein each of said first output transistor, said second output transistor, said first switch device, said second switch device. said third switch device, and said fourth switch device is an insulated-gate-type field-effect transistor.

4. The output-buffer circuit as claimed in claim 1, wherein said pull-up circuit includes:

a first variable-resistance device; and a fifth switch device, said first variable-resistance device and said fifth switch device connected in series between the first power line and the given node, and wherein said pull-down circuit includes:

a sixth switch device; and a second variable-resistance device, said sixth switch device and said second variable-resistance device connected in series between the given node and the second power line.

5. The output-buffer circuit as claimed in claim 4, wherein said first variable-resistance device includes a p-channel transistor which has a source thereof connected to the first power line and a gate thereof receiving a first fixed voltage, and said fifth switch device includes a p-channel transistor which has a source thereof connected to the drain of the p-channel transistor of said first variable-resistance device and a drain thereof connected to the given node, and has an on/off state thereof controlled by the second driver input, and wherein said sixth switch device includes an n-channel transistor which has a drain thereof connected to the given node, and has an on/off state thereof controlled by the first driver input, and said second variable-resistance device includes an n-channel transistor which has a drain thereof connected to the source of the n-channel transistor of the sixth switch device, a source thereof connected to the second power line, and a gate thereof receiving a second fixed voltage.

6. The output-buffer circuit as claimed in claim 5, further comprising a bias circuit which includes first through third potential-division elements connected in series between the first power line and the second power line, a joint point between said first and second potential-division elements generating the first fixed voltage, and a joint point between said second and third potential-division elements generating the second fixed voltage.

7. The output-buffer circuit as claimed in claim 6, wherein said first potential-division element includes a p-channel transistor which has a source thereof connected to the first power line and a gate thereof connected to a drain thereof, and said second potential-division element includes a fixed resistor which has one end thereof connected to the drain of the p-channel transistor of the first potential-division element, said third potential-division element including an n-channel transistor which has a drain thereof connected to another end of the fixed resistor of the second potential-division element, a source thereof connected too the second power line, and a gate thereof connected to the drain thereof.

8. The output-buffer circuit as claimed in claim 5, wherein said first potential-division element includes a p-channel transistor which has a source thereof connected to the first power line and a gate thereof connected to a drain thereof, and said second potential-division element includes a p-channel transistor which has a source thereof connected to the drain of the p-channel transistor of the first potential-division element and a gate thereof connected to the second power line, and includes an -channel transistor which has a drain thereof connected to the drain of the p-channel transistor of said second potential-division element and a gate thereof connected to the first power line, said third potential-division element including an n-channel transistor which has a drain thereof connected to a source of the n-channel transistor of the second potential-division element, a source thereof connected to the second power line, and a gate thereof connected to the drain thereof.

9. The output-buffer circuit as claimed in claim 6, wherein
said first potential-division element includes a p-channel transistor which has a source thereof connected to the first power line and a gate thereof connected to a drain thereof, and
said second potential-division element includes a fixed resistor which has one end thereof connected to the drain of the p-channel transistor of said first potential-division element,
and wherein
said third potential-division element includes a fixed resistor which has one end thereof connected to another end of the fixed resistor of said second potential-division element, and
said fourth potential-division element includes an n-channel transistor which has a drain thereof connected to another end of the fixed resistor of the third potential-division element, a source thereof connected to the second power line, and a gate thereof connected to the drain thereof.

10. The output-buffer circuit as claimed in claim 4, wherein
said first variable-resistance device includes a p-channel transistor which has a source thereof connected to the first power line and a gate thereof receiving a fixed voltage, and
said fifth switch de vice includes a p-channel transistor which has a source thereof connected to the drain of the p-channel transistor of said first variable-resistance device and a drain thereof connected to the given node, and has an on/off state thereof controlled by the second driver input,
and wherein
said sixth switch device includes an n-channel transistor which has a drain thereof connected to the given node, and has an on/off state thereof controlled by the first driver input, and
said second variable-resistance device includes an n-channel transistor which has a drain thereof connected to the source of the n-channel transistor of the sixth switch device, a source thereof connected to the second power line, and a gate thereof receiving the fixed voltage.

11. The output-buffer circuit as claimed in claim 10, further comprising a bias circuit which includes first through fourth potential-division elements connected in series between the first power line and the second power line, a joint point between said second and third potential-division elements generating the fixed voltage.

12. The output-buffer circuit as claimed in claim 11, wherein
said first potential-division element includes a p-channel transistor which has a source thereof connected to the first power line and a gate thereof connected to a drain thereof, and
said second potential-division element includes a p-channel transistor which has a source thereof connected to the drain of the p-channel transistor of the first potential-division element and a gate thereof connected to the second power line,
and wherein,
said third potential-division element includes an n-channel transistor which has a drain thereof connected to the drain of the p-channel transistor of said second potential-division element and a gate thereof connected to the first power line, and
said fourth potential-division element including an n-channel transistor which has a drain thereof connected to a source of the n-channel transistor of the third potential-division element, a source thereof connected to the second power line, and a gate thereof connected to the drain thereof.

13. The output-buffer circuit as claimed in claim 1, wherein said capacitor includes a plurality of gate capacitances of insulated-gate-type field-effect transistors connected in parallel.

* * * * *